(12) United States Patent
Yeung (10) Patent No.: US 9,727,839 B2
(45) Date of Patent: Aug. 8, 2017

(54) DISTRIBUTED PRIMARY DEVICE DATA COLLECTOR WITH FAILOVER OPERATION

(71) Applicants: Kabushiki Kaisha Toshiba, Minato-ku (JP); Toshiba TEC Kabushiki Kaisha, Shinagawa-ku (JP)

(72) Inventor: Michael Yeung, Mission Viejo, CA (US)

(73) Assignees: Kabushiki Kaisha Toshiba, Minato-ku (JP); Toshiba TEC Kabushiki Kaisha, Shinagawa-ku (JP)

( * ) Notice: Subject to any disclaimer, the term of this patent is extended or adjusted under 35 U.S.C. 154(b) by 0 days.

(21) Appl. No.: 14/859,478

(22) Filed: Sep. 21, 2015

(65) Prior Publication Data
US 2016/0283167 A1    Sep. 29, 2016

Related U.S. Application Data

(60) Provisional application No. 62/137,455, filed on Mar. 24, 2015, provisional application No. 62/181,305, filed on Jun. 18, 2015.

(51) Int. Cl.
*G06F 15/00* (2006.01)
*G06Q 10/08* (2012.01)

(52) U.S. Cl.
CPC .................. *G06Q 10/087* (2013.01)

(58) Field of Classification Search
USPC ........................................................ 358/1.15
See application file for complete search history.

(56) References Cited

U.S. PATENT DOCUMENTS

| 8,190,791 B2 * | 5/2012 | Imai | H04L 43/0817 |
| | | | 710/15 |
| 2003/0030842 A1 * | 2/2003 | Suyehira | G03G 15/5079 |
| | | | 358/1.15 |
| 2013/0250329 A1 * | 9/2013 | Satoh | G06F 3/126 |
| | | | 358/1.13 |

* cited by examiner

*Primary Examiner* — Saeid Ebrahimi Dehkord
(74) *Attorney, Agent, or Firm* — Ulmer & Berne LLP (57) ABSTRACT

A network document processing device includes an embedded controller. The controller monitors one or more document processing devices occurring on the device. The controller is further operable to probe one or more networked document processing devices to determine if it or they are operable to monitoring other network document processing devices. If not, the controller suitably undertakes monitoring of some or all of the networked devices. This monitoring may be concluded when another document processing device becomes active. Multiple document processing devices may also share all or part of monitoring of document processing devices for redundancy, load sharing or integrity checking.

20 Claims, 9 Drawing Sheets

DISTRIBUTED PRIMARY DEVICE DATA COLLECTOR WITH FAILOVER OPERATION

TECHNICAL FIELD

The subject application teaches example embodiments that relate generally to monitoring of networked document processing devices.

SUMMARY

In an example embodiment, a document processing device includes an embedded controller, memory and a network interface, and a monitor to monitor internal document processing operations completed by the document processing device. The embedded controller generates internal device operation data in accordance with an output of the monitor and receives networked device operation data corresponding to associated document processing operations from at least a second networked document processing device. The embedded controller further processes internal device operation data. The memory stores identity data representative of at least a second networked document processing device configured for processing of device operation. The embedded controller initiates a network probe to the second networked document processing device in accordance with the identity data to determine whether the second networked document processing device is operational for processing of device operation data. The embedded controller processes internal and networked device operation data when the probe indicates that the second networked document processing device is not operational. In an embodiment, the embedded controller initiates the probe based on prescribed timing. In an embodiment, network device operation data includes data about document processing operations completed by the second networked document processing device. In an embodiment, the embedded controller is in data communication with, and receives parameter data from, an administrative control via the network interface. The embedded controller receives network device operation data from a plurality of networked document processing devices identified in the received parameter data. In an embodiment, the embedded controller cedes processing of networked device operation data to the second networked document device when the probe results indicate that the second networked document processing device is operational. In an embodiment, the embedded controller receives data corresponding to the prescribed timing from the administrative control terminal. In an embodiment, the embedded controller receives content data from the administrative control terminal that specifies the content of the networked device operation data.

In another example embodiment, a method includes monitoring internal document processing operations by a document processing device, and generating internal device operation data based on the monitored operations. The method further includes generating, by an integrated controller, a probe that includes probe data corresponding to operation of at least a second document processing device of a number of document processing devices, and outputting the probe onto a network via a network interface. The method further includes receiving remote device operation data via the network interface from at least one of the document processing devices when the probe indicates that at least the second document processing devices is not operational for processing document operation data, and processing internal and networked device operation data by the integrated controller upon receiving the remote device operation data. In an embodiment, the method includes monitoring internal document processing operations such as photocopying, printing, faxing, or scanning In an embodiment, the method include generating the internal device operation data that includes internal page count data, receiving networked device operation data that includes networked page count data, and outputting report data processed from the internal and networked device operation data. In an embodiment, the method further includes sending the report data to an administrator. In an embodiment, monitoring internal document processing operations includes monitoring consumables. In an embodiment, monitoring internal document processing operations includes monitoring paper, ink, or toner.

In an example embodiment, a document processing device includes a controller, a memory, a network interface, and a monitor that monitors document processing operations of the document processing device. The network interface is configured to allow data communication with local networked document processing devices using a local area network, and remote networked document processing devices using a remote local area network. The controller generates internal device operation data based on the output of the monitor, and processes the internal device operation data. The controller receives remote operation data for document processing operations of a document processing device in the local area network and a document processing device from the wide area network. The memory stores identity data of a second networked document processing device that processes device operation data of multiple networked document processing devices. The controller initiates a probe, via the network interface, to the second networked document processing device based on the stored identity data to determine whether the second networked processing device is operational for processing of the device operation data of the multiple networked document processing devices. The controller is configured to process internal and remote device operation data when the problem indicates the second networked device is not operational for processing device operation data. In an embodiment, the controller can initiate the probe via the wide area network interface. In an embodiment, the probe is a Simple Network Management Protocol Request (SNMP request). In an embodiment, the controller receives an ordered device list and suppresses probe initiation when an internal identifier of the document processing device is identified as the primary controller device in the list. In an embodiment, the controller processes at least a portion of the internal and remote device operation data cooperatively with one or more load-sharing document processing devices.

In an example embodiment, a document processing system includes a number of multifunction peripherals, each of which include an embedded controller having a processor and a memory, a network interface capable of communicating with one or more networked multifunction peripherals, and an embedded monitor for monitoring internal document processing operations completed by the multifunction peripheral itself and at least one of the networked multifunction peripherals. The embedded controller generates internal device operation data based on the output of the embedded monitor, and receives networked device operation data regarding document processing operations for one or more of the networked multifunction peripherals. The embedded controller processes internal and networked device operation data which is output via the network interface. In an embodiment, the network interface receives monitor instruction data, and the controller selectively enables or disables processing of networked device operation data in response to the received monitor instruction data.

BACKGROUND

Document processing devices are in widespread use in many businesses and office settings. Such devices include copiers, scanners, printers and facsimile machines. Today, one or more functions associated with such devices are combined in a single unit, referred to as multifunction peripheral ("MFP").

Document processing devices can be not only costly to purchase, but also expensive to maintain. This is particularly true in connection with devices that include moving, mechanical parts such as are necessary for interacting with tangible media, such as paper, film, transparencies or interfacing with removable media, such as removable drives, memory cards, flash memory devices, bar code readers, magnetic card readers, and the like. Devices require periodic maintenance operations which may include cleaning, resupplying, repairing or upgrading. Failure to provide maintenance in a timely manner can result in significant expense for repair or loss of device use.

Operations such as printing, faxing or copying may include depletion of consumables, such as paper, ink or toner. Monitoring of device operation facilitates replacement of such consumables. In other situations, monitoring of device operation facilitates assessing charges for device use. In other situations, monitoring of device operation facilitates imposition of usage quotas.

Document processing devices may include counters or other usage monitoring systems to allow for attending to maintenance or servicing operations at known intervals. An administrator would approach individual devices to determine a level of usage from its associated monitor. Third party vendors, such as Pharos™ and PaperCut™, provide solutions for centrally managing jobs, tracking usage for a number of MFPs, and enforcing usage quotas among those MFPs. However, third party solutions require a dedicated server for performing those tasks. A dedicated server not only increases management costs, but also introduces a potential point of failure in the network. When all jobs are routed through a single monitor, failure of a network or failure of a monitoring workstation would either stop document processing operations or result in lost monitoring data during the outage. In some instances, the dedicated server may be managed by a third party, further complicating management for IT professionals within an organization. Also, depending upon the capabilities of the MFP and the configuration of the network, users may be able bypass a third party's dedicated server and print to a MFP directly, which can lead to quotas not being enforced properly or job accounting discrepancies that must be rectified.

DETAILED DESCRIPTION

Figure 1:
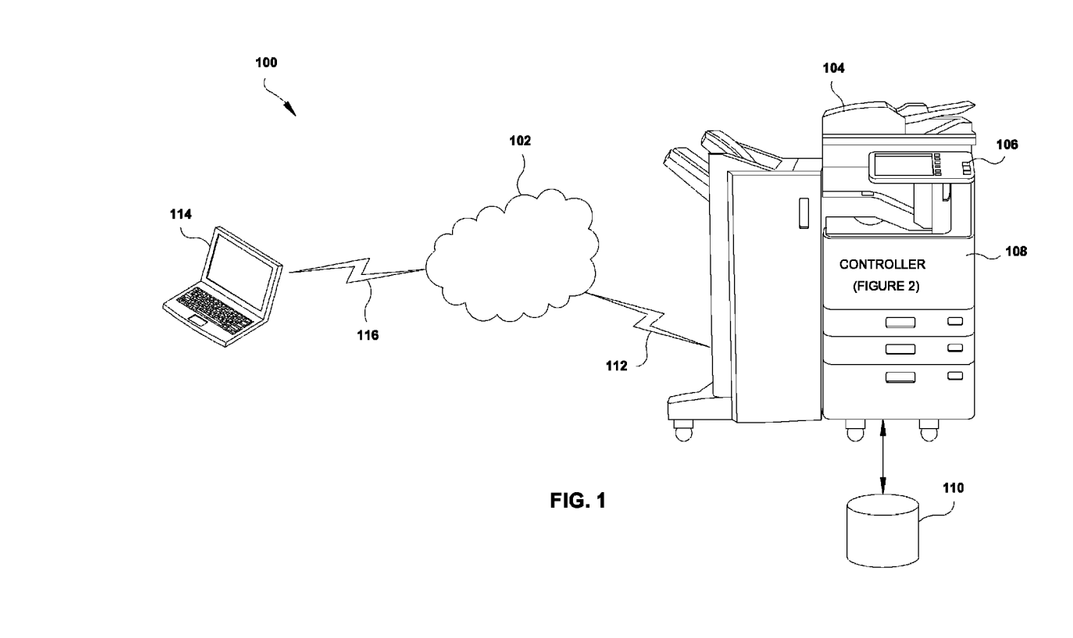
FIG. 1 is a diagram of an example of a document processing system that includes a multifunction peripheral.

Turning to FIG. 1, illustrated is example embodiment of a document processing system 100 that includes a network 102 that is in data communication with one or more document processing devices such as that illustrated by document processing device 104, suitably comprised of a multifunction peripheral ("MFP") as illustrated. MFP 104 is suitably operable for printing, faxing, scanning, copying, e-mailing, or any other document processing operation will be understood by one of ordinary skill in the art. In the illustrated embodiment, MFP 104 includes a user interface 106. Operation of the device is suitably managed by an embedded controller 108 and embedded data storage 110 as will be detailed further below.

In the example embodiment of FIG. 1, MFP 104 is coupled for data communication 112 with network 104, suitably comprised of a local area network (LAN), a remote local area network (RLAN), a wide area network (WAN) which may comprise the Internet, or any combination thereof. In the example embodiment of FIG. 1, a computer, terminal, workstation, tablet computer, smartphone, or the like, such as that illustrated by computer 114 is also suitably placed in data communication 116 with network 102. Computer 114 suitably provides an interface for an operator or technician to access MFP 104 for control, administration or accounting relative to device operation.

The architecture of the example embodiment of FIG. 1 illustrates an overview of document processing management system wherein an administrator is suitably in communication with one or more MFPs for monitoring, accounting, configuring or controlling operations. With a network-based administration system, a technician can connect with multiple devices over long distances for efficient and cost-effective management.

Figure 2:
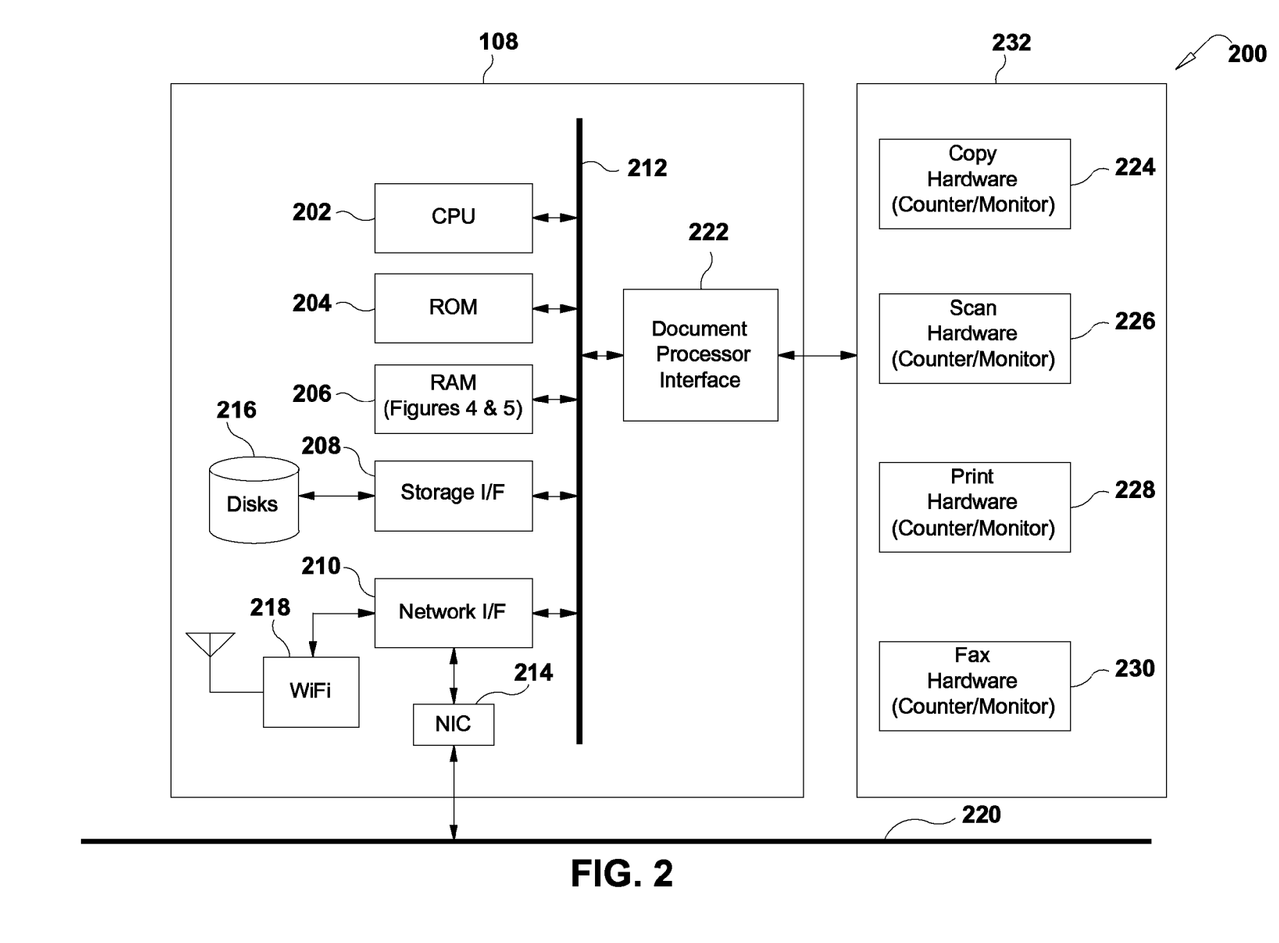
FIG. 2 is a block diagram of an example of components of a multifunction peripheral.

Turning now to FIG. 2, illustrated are functional components 200 suitably comprising a multifunctional peripheral such as MFP 104 of FIG. 1. Included is an example embodiment of controller 108 which is suitably comprised of a computer. Included in example controller 108 are one or more processors, such as illustrated by central processor unit (CPU) 202. Also included are non-volatile memory, such as read-only memory (ROM) 204, random access memory (RAM) 206, a storage interface 208 and a network interface 210. In the example embodiment, CPU 202, ROM 204, RAM 206, storage interface 208 and network interface 210 are in mutual data communication via bus 212. Storage interface 208 facilitates data access with a bulk data storage, such as one or more disks 216, or any other suitable data storage such as a flash drive, CD, DVD or the like. Network interface 210 suitably provides for external data communication, such as with a network interface connection (NIC) 214 or WiFi interface 218. NIC 214 or WiFi interface 218 suitably provide for connection to an associated network 220.

In the example embodiment of FIG. 2, a document processor interface 222 is also in data communication with bus 212, and provides a gateway to copy hardware 224, scan hardware 226, print hardware 228 and fax hardware 230 which together comprise MFP functional hardware 232. MFP functional hardware 232 suitably includes embedded monitors, such as resource monitors or counters to facilitate metering or maintenance intervals as will be detailed further below.

Figure 3:
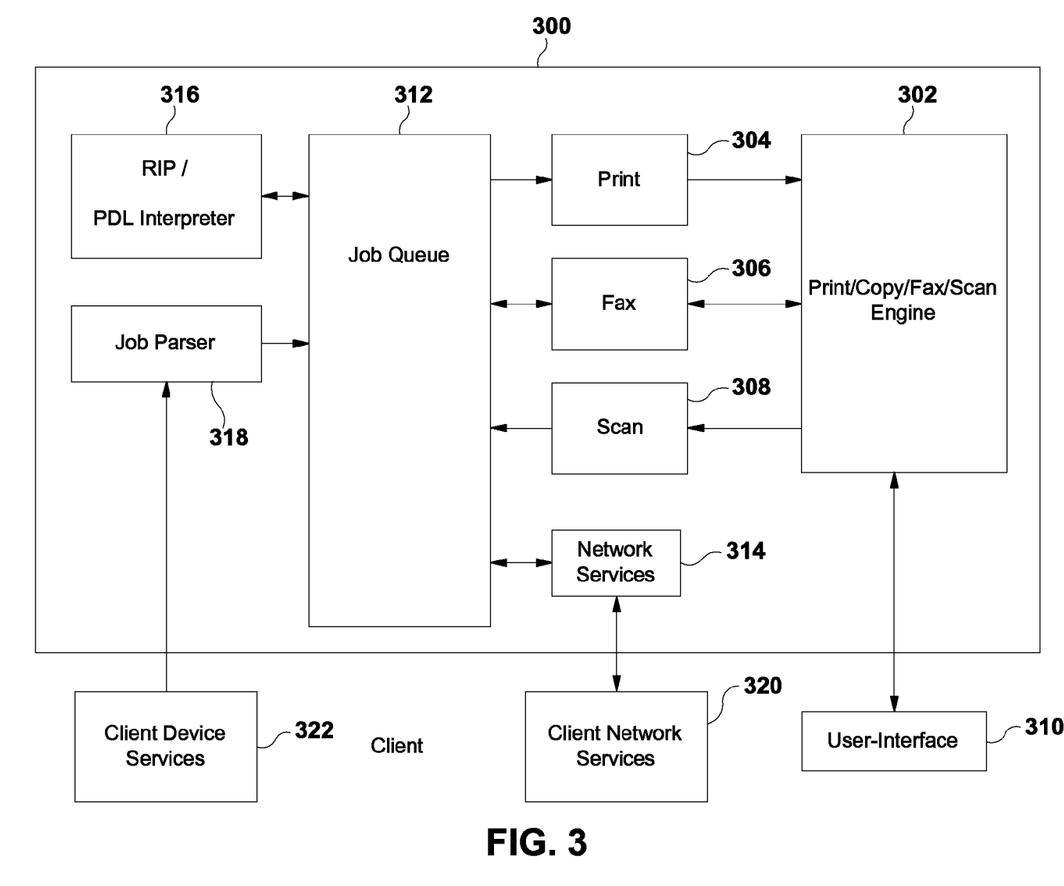
FIG. 3 is a block diagram of an example of functional components of a multifunction peripheral.

Turning now to FIG. 3, illustrated is a functional block diagram 300 of an example MFP. Included is a print/copy/scan engine 302 which interfaces with print control 304, fax control 306, and scan control 308, all of which are suitably interfaced with job queue 312. Print/copy/scan engine 302 is suitably provided with user access via user interface 310. Job queue 312 is suitably interfaced with raster image processor (RIP) and page description language (PDL) functionality 316, as well as job parser 318. Job queue 312 is also suitably interfaced with network services 314, which in turn is interfaced with client network services 320. Job parser 318 is suitably interfaced with client device services 322.

Figure 4:
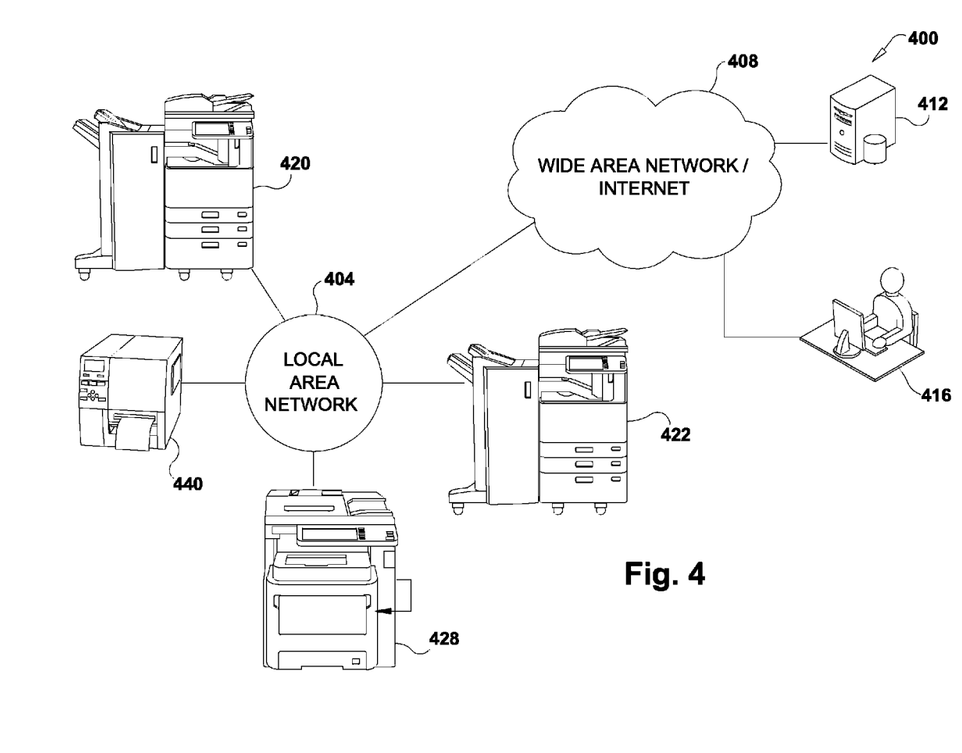
FIG. 4 is a diagram of an example of a networked document processing system.

Turning now to FIG. 4, illustrated is an example embodiment of a networked document processing system 400 that includes one or more local area networks such as LAN 404 suitably in data communication with a wide-area network such as WAN 408 which may comprise connection via the Internet. In the illustrated embodiment, WAN 408 suitably comprises a service cloud that couples cloud database storage 412 and one or more administrators 416. LAN 404 includes one or more document processing devices, such as MFPs 420 and 422, as well as printer 428, label printer 440, or any other suitable networked document processing device as will be appreciated by one of ordinary skill in the art. The example embodiment of FIG. 4 provides for networked management of document processing devices, illustrating devices that can be managed by one or more administrators covering multiple locations and disparate devices.

Figure 5:
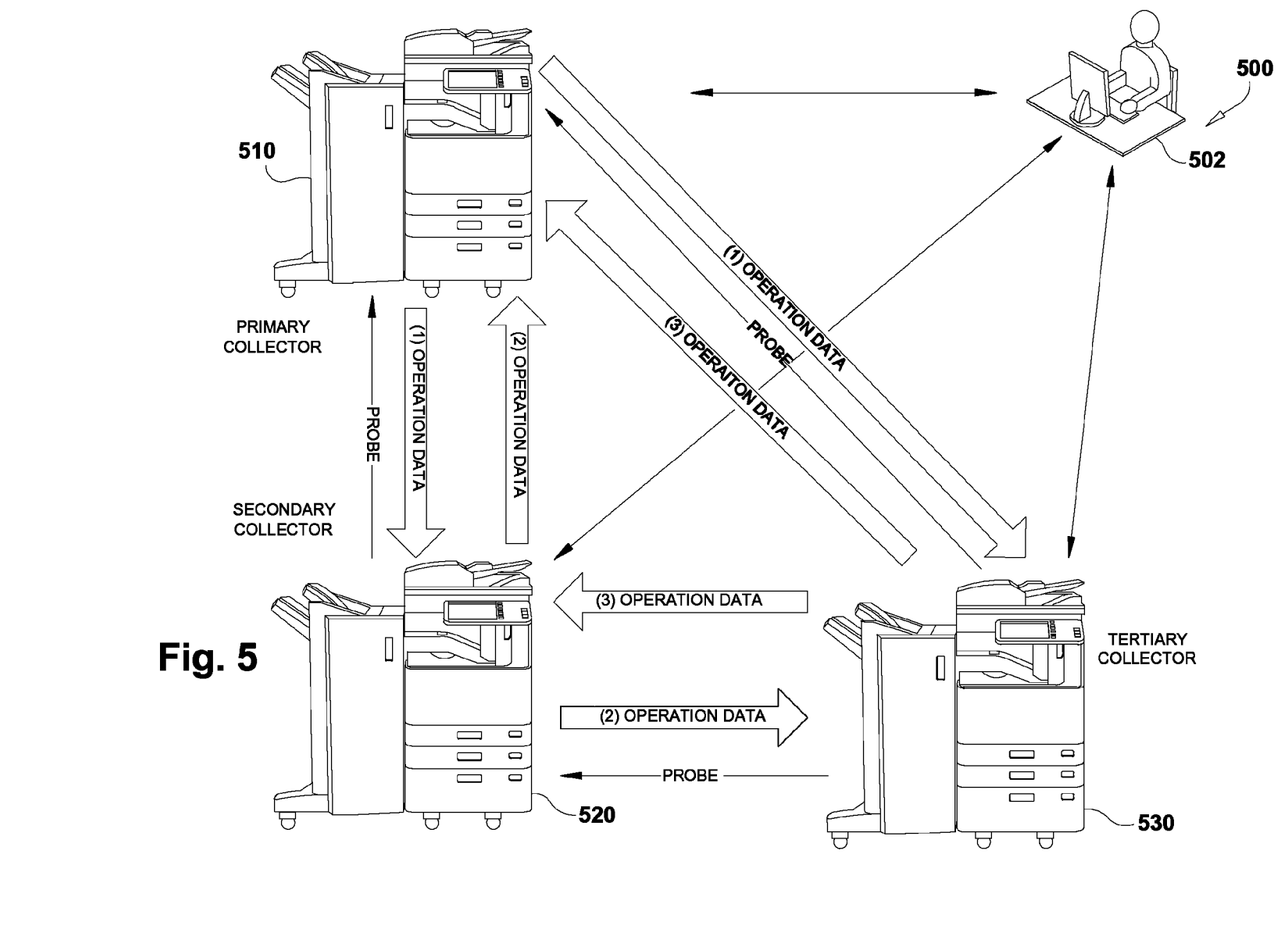
FIG. 5 is a diagram of an example of a networked document processing system.

Turning now to FIG. 5, illustrated is an example embodiment of a networked document processing system 500 employing distributed data collection functionality to assist in monitoring or reporting of devices. An administrator or technician 502 is enabled to access document processing devices via a LAN, WAN, RLAN or any combination thereof. In the illustrated example MFPs 510, 520 and 530 are in networked data communication. Each device suitably includes an embedded controller such as that detailed above. One, two, three or more MFPs are configured so as to be enabled to function as a monitor of other devices on the network. By way of further example, MFP 510 is designated as a collector of other MFP devices. Such designation is suitably assigned by an administrator and includes specification for devices to be monitored, such as via a range of IP addresses, which will be further detailed below. In another example embodiment, monitoring is specified for one or more operations of a document processing device. By way of further example, device may monitor only device operations that include consumables such as paper, toner or ink.

In the example embodiment of FIG. 5, MFP 510 is configured as a primary collector to monitor MFP 520 and MFP 530, although it will be appreciated that more or different devices are suitably monitored as detailed above. MFP 510 suitably retrieves device data on occasion, such as periodically or other set or selected intervals. As detailed above, device information suitably comprises count information, such as copy count or page count, consumable usage, service intervals, device maintenance information, service interruptions, malfunctions, or the like. Device information further facilitates enforcement of usage policies or job accounting. Accumulated device data is suitably made available locally or via network connection, such as to administrator or technician 502.

MFP 520 is suitably configured as a secondary collector analogously to MFP 510 for network device monitoring, but is not initially enabled for such purpose. MFP 520 occasionally probes MFP 510 to determine if it is functioning as needed for network device monitoring. This is suitably accomplished at prescribed or periodic intervals. This is suitably accomplished by a SNMP query, a device ping, or any other suitable probe as will be appreciated by one of ordinary skill in the art. When MPF 520 determines that MFP 510 is not performing as required, MFP 520 suitably enables its system monitoring capabilities so as to eliminate or minimize monitoring interruption. When a probe from MFP 520 results in a determination that MFP 510 is once again functional for monitoring of network devices, it suitably cedes its monitoring operation back to MFP 510.

In the example embodiment of FIG. 5, MFP 530 is suitably enabled to initiate a probe to MFP 520. If MFP 520 is not operational, MFP 530 as a tertiary collector suitably undertakes network device monitoring as described above.

In the example embodiment of FIG. 5, one or more MFPs are suitably enabled for concurrent monitoring of network devices. Such concurrency, while duplicative of monitoring, facilitates fault tolerance in the event that one or more monitoring devices become disabled. One or more devices are suitably used to generate reports, such as to a technician or system administrator. In yet a further example embodiment, devices are suitably assigned a complementary or overlapping set of devices for monitoring. Monitoring information so acquired is suitably aggregated. Redundant monitoring information is suitably used for cross-checking or error reporting.

In view of the forgoing example embodiment, it will be appreciated that, when MFP 510 is operational, device monitoring is accomplished via that device. While MFP 510 is operational, probes from MFP 520 determine that there is no need to take over monitoring. Similarly, probes from MFP 530 will cause it to determine that there is no need to take over monitoring. It will be appreciated that any number of devices are suitably implemented for backup monitoring and such devices are suitably connected in a LAN, RLAN, WLAN or Internet connection.

Figure 6:
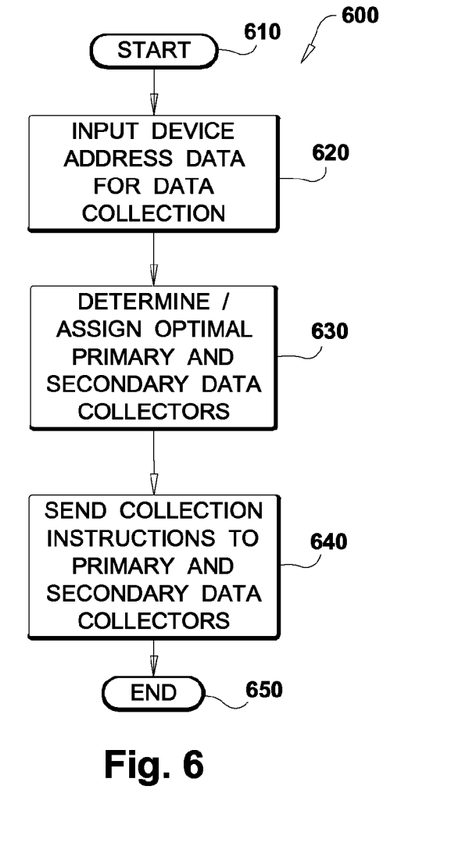
FIG. 6 is a flow diagram of an example process for assignment of data collectors.

Turning now to FIG. 6, illustrated is an example embodiment of operation of a monitoring operation 600. Operation commences at 610. At 620, device data for data collection is input. Next, at 630, a determination is made as to optimal primary and secondary data collectors. Tertiary and other data collectors can similarly be determined as would be understood in the art. Collection instructions are relayed to the devices at 640 and the operation ends at 650.

Figure 7:
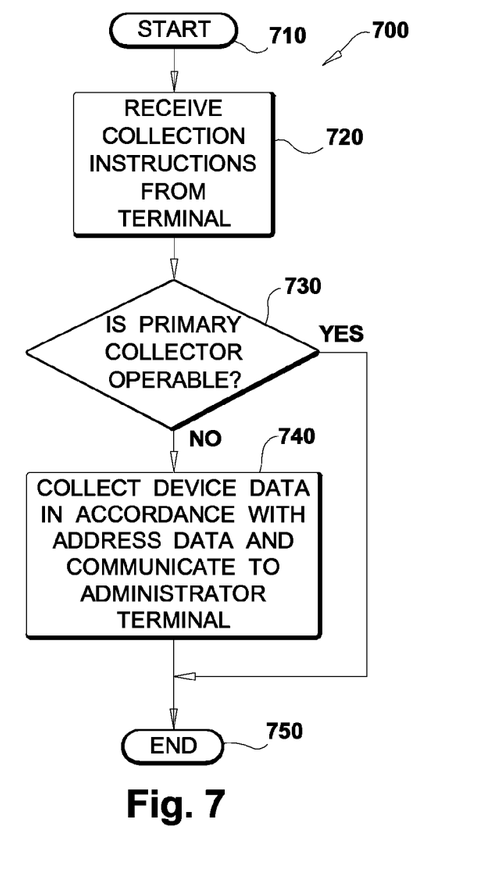
FIG. 7 is a flow diagram of an example process for data collection.

FIG. 7 illustrates an example embodiment of backup collection operation 700. Operation commences at 710. At 720, one or more devices, such as MFPs, receive collection instructions, suitably from an administrative terminal as detailed above. Next, at 730, a determination is made whether the primary collector is active. If it is, the process suitably ends at 750, and the determination is repeated again at selected or set intervals. If the primary collector is not active, the device will become the collector and collect data in place of the primary collector at 740. The backup collection process can be repeated for tertiary and other data collectors.

Figure 8:
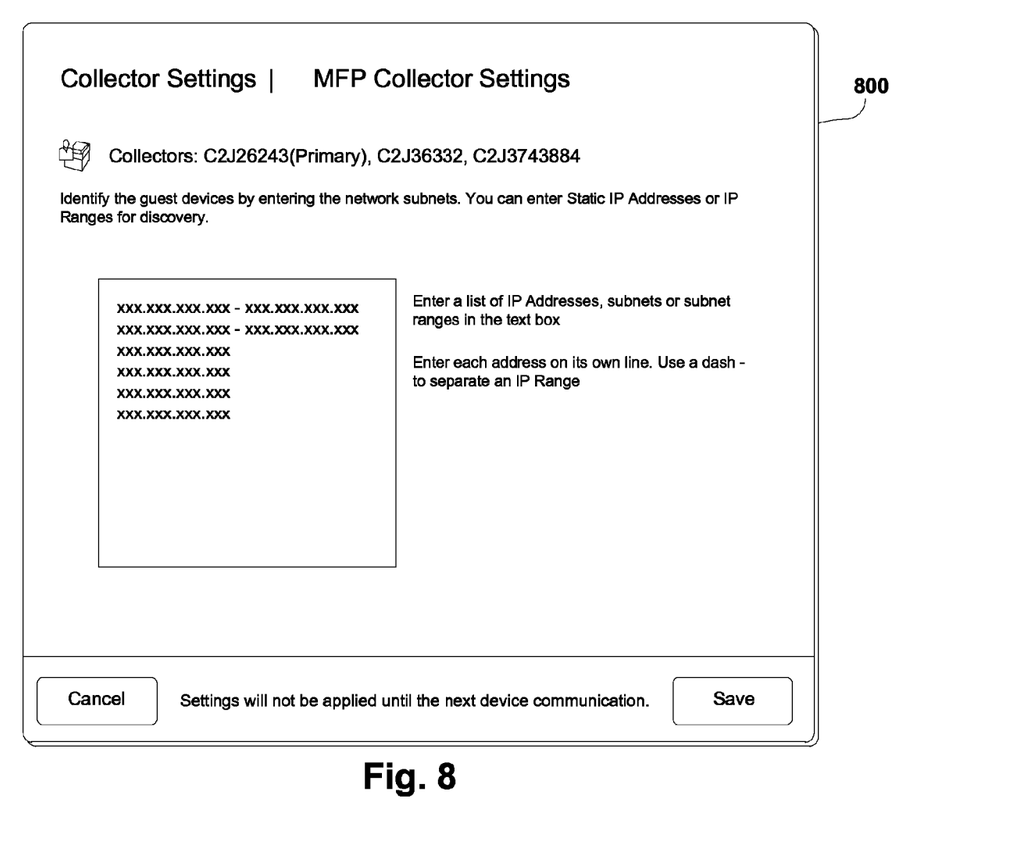
FIG. 8 is a diagram of an example template for specification for data collection.

FIG. 8 illustrates an example embodiment of a user interface 800 that facilitates association of a list of IP addresses, ranges or subnets, or any other suitable network demarcation, to define collectors. The primary collector is suitably denoted, as are any backup collectors.

Figure 9:
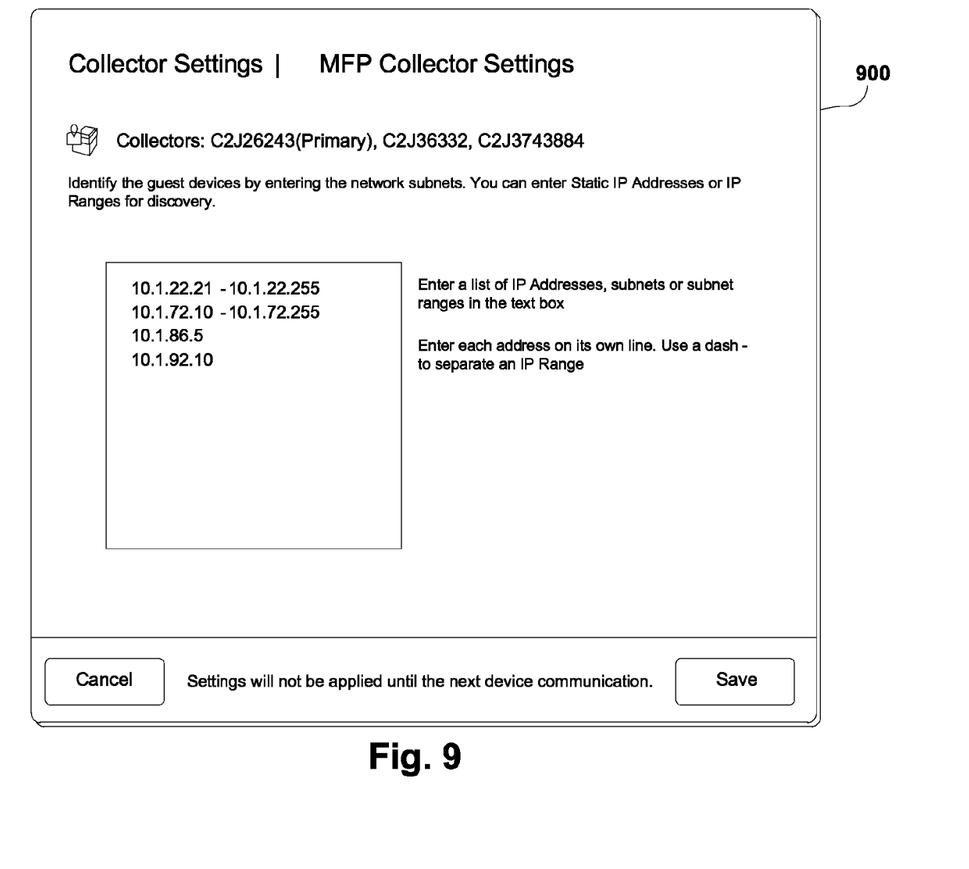
FIG. 9 is an example specification for data collection.

FIG. 9 illustrates an example embodiment of an IP address list as entered by a service cloud user. In this example, the set of IP addresses defines the devices to be polled and collected in accordance with a selected or predetermined schedule. The list is suitably created by a service cloud user and stored in the cloud, such as via cloud database storage 412 of FIG. 4. At a scheduled time, a collector device will discover a network to find the devices in the list. Data is suitably collected and the list updated in the cloud. Thus, devices that were discovered will be monitored and data updated.

Figure 10:
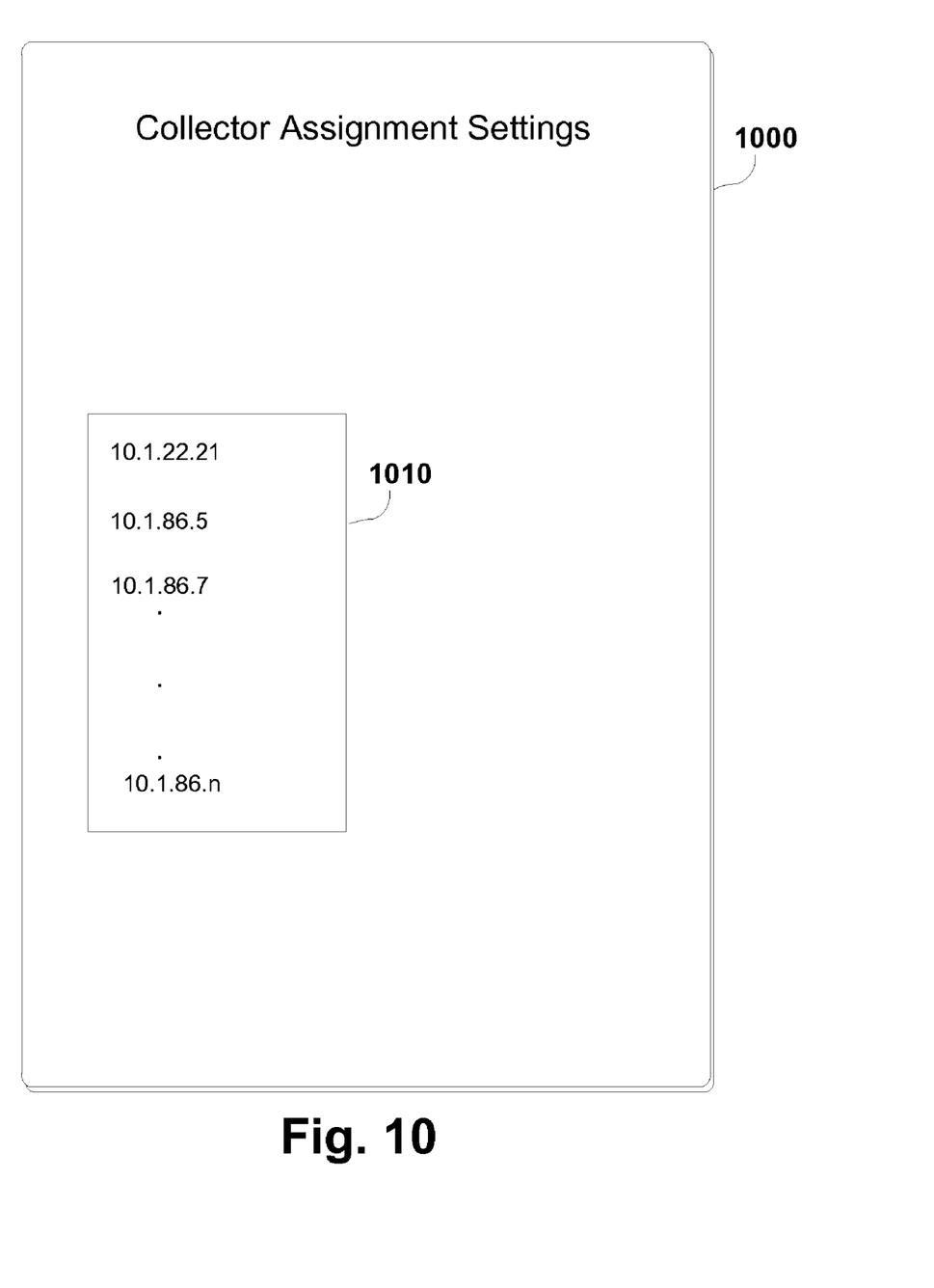
FIG. 10 is an example specification for hierarchical assignment of data collectors.

Turning now to FIG. 10, illustrated is an example embodiment of collector settings 1000 suitably providing a hierarchical ordering of document processing device having monitoring function, or concurrent, redundant or overlapping monitoring capability. This information is suitably communicated to one or more document processing devices having network device monitoring capability, such as device listing 1010. In the illustrated example, a leading or initial IP address 10.1.22.21 designates a primary monitoring device. Each receiving device suitably compares its own IP address with the listed information in the device listing 1010. In a case when the receiving device determines that it is the primary collector, 10.1.22.21, it need only commence monitoring of device information for specified devices. A second device having IP address 10.1.86.5 suitably probes device 10.1.22.21 and commences collection when that probe reveals a fault. Similarly, other devices down the line, 10.1.86.7 and so on, suitably probe one or more, or all of the devices ahead of it in the hierarchy to determine whether it should commence monitoring operations. As noted above, device listing 1010 also suitably defines devices for concurrent monitoring of all or some of the networked devices or subsets of their functionality.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the spirit and scope of the inventions.

What is claimed is:

1. A document processing device comprising:
   an embedded controller including a processor and a memory in data communication with the processor, the memory operable for storage of data and instructions;
   a network interface configured for data communication with a plurality of networked document processing devices via an associated network; and
   a monitor configured to monitor internal document processing operations completed by the document processing device,
   wherein the memory is further configured for storing identity data representative of at least a second networked document processing device configured to process and report device operation data for the plurality of networked document processing devices, and
   wherein the embedded controller is configured to generate internal device operation data in accordance with an output of the monitor,
   receive, via the network interface, networked device operation data corresponding to document processing operations from the plurality of networked document processing devices,
   initiate a probe, via the network interface, to at least a second networked document processing device designated as a higher priority device activity monitor in accordance with the identity data to determine whether the second networked document processing device is operational for processing of device operation data from the plurality of networked document processing devices, and
   assume functionality of the second network document processing device and process and report internal and networked device operation data from the plurality of networked processing devices when the probe indicates that the second networked document processing device is not operational for processing thereof.

2. The document processing device of claim 1 wherein the embedded controller is further configured to initiate the probe in accordance with a prescribed timing.

3. The document processing device of claim 2 wherein the networked device operation data includes data associated with document processing operations completed on each of the plurality of networked document processing devices.

4. The document processing device of claim 3 wherein the embedded controller is further configured for data communication with an associated administrative control terminal via the network interface,
   the embedded controller is further configured to receive parameter data from the administrative control terminal, and
   the embedded controller is further configured to receive the networked device operation data from at least a subset of the plurality of networked document processing devices in accordance with received parameter data.

5. The document processing device of claim 2 wherein the embedded controller is further configured to cede processing of the networked device operation data when probe results indicate that the second networked document processing device is operational.

6. The document processing device of claim 2 wherein the embedded controller is further configured to receive data corresponding to the prescribed timing from the associated administrative control terminal via the network interface.

7. The document processing device of claim 2 wherein the embedded controller is further configured to receive content data specifying content of the networked device operation data from the associated administrative control terminal via the network interface.

8. A method comprising:
   monitoring internal document processing operations by a document processing device;
   generating internal device operation data corresponding to monitored internal document processing operations on the document processing device on an integrated controller, the controller including a processor and an associated memory;
   generating a probe, via the integrated controller, the probe including probe data corresponding to operation of at least a second document processing device, designated as a higher priority device activity monitor, of a networked plurality thereof;
   outputting the probe data on to an associated network via a network interface;

receiving remote device operation data via the network interface from the plurality of networked document processing devices when the probe yields that the at least a second document processing device is not operational for processing of document operation data; and responsive to receiving the remote device operation data, processing internal and networked device operation data via the integrated controller by assuming functionality of the second networked document processing device to report internal document processing operations and remote device operation data.

9. The method of claim 8 wherein monitoring internal document processing operations includes monitoring of photocopying, printing, faxing or scanning operations.

10. The method of claim 8 further comprising:
generating the internal device operation data inclusive of internal page count data;
receiving the networked device operation data inclusive of networked page count data; and
outputting report data comprising processed internal and networked device operation data.

11. The method of claim 10 further comprising communicating the report data to an associated administrator.

12. The method of claim 8 wherein monitoring internal document processing operations includes monitoring of document processing operation consumables.

13. The method of claim 12 wherein monitoring of document processing operations includes monitoring of at least one of paper, ink or toner.

14. A document processing device comprising:
a controller including a processor and a memory in data communication with the processor, the memory configured for storage of data and instructions;
a network interface configured for data communication with a plurality of locally networked document processing devices via an associated local area network and further configured for data communication, via an associated wide area network interface, with a plurality of remote document processing devices associated with a remote local area network; and
a monitor configured to monitor document processing operations completed by the document processing device,
wherein the memory is further configured for storing identity data representative a second networked document processing device, designated as a higher priority device activity monitor, operable for processing of device operation data for the plurality of locally networked document processing devices the plurality of remote document processing devices, and
wherein the controller is configured to
generate internal device operation data in accordance with an output of the monitor,
receive, via the network interface, remote device operation data corresponding to associated document processing operations from at least one document processing device within the local area network and at least one document processing device within the remote area network via the wide area network,
process internal device operation data,
initiate a probe, via the network interface, to the second networked document processing device in accordance with the identity data to determine whether the second networked document processing device is operational for processing of device operation data from the plurality of networked document processing devices, and
assume functionality of the second networked document processing device to process and report internal and remote device operation data for the plurality of locally networked document processing and the plurality of remote document processing devices when the probe indicates that the second networked document processing device is not operational for processing thereof.

15. The document processing device of claim 14 wherein the controller is further configured to initiate the probe to the second networked document processing device via the wide area network interface.

16. The document processing device of claim 14 wherein the controller is further configured to initiate the probe as a Simple Network Management Protocol Request (SNMP) request.

17. The document processing device of claim 14 wherein the controller is further configured to receive ordered device list data, and
the controller is further configured to suppress probe initiation when an internal identifier of the document processing device is associated with a primary collector device identifier in the device list data.

18. The document processing device of claim 14 wherein the controller is further configured to process at least a portion of internal and remote device operation data cooperatively with at least one load-sharing document processing device in data communication via the network interface.

19. A document processing system comprising a plurality of multifunction peripherals, each multifunction peripheral including:
an embedded controller including a processor and a memory in data communication with the processor, the memory operable for storage of data and instructions;
a network interface configured for data communication with at least one additional multifunction peripheral of the plurality thereof via an associated network; and
an embedded monitor configured to monitor internal document processing operations completed by the multifunction peripheral and the at least one additional multifunction peripheral of the plurality thereof via the associated network,
wherein the embedded controller is configured to
generate internal device operation data in accordance with an output of the embedded monitor,
receive, via the network interface, networked device operation data corresponding to associated document processing operations from the at least one additional multifunction peripheral,
receive, via the network interface, a probe response indicative of a failure of monitoring operation of another multifunction peripheral; and
process internal device operation data and networked device operation data, and
wherein the network interface is further configured to output processed internal device operation data and networked device operation data in accordance with a received probe response.

20. The document processing system of claim 19 wherein the network interface is further configured to receive monitor instruction data, and wherein the controller is further configured to selectively enable or disable processing of at least networked device operation data responsive to received monitor instruction data.

* * * * *